United States Patent [19]
Iwama

[11] Patent Number: 5,808,820
[45] Date of Patent: Sep. 15, 1998

[54] MAGNETIC DISK UNIT

[75] Inventor: Hideo Iwama, Tokyo, Japan

[73] Assignee: NEC Corporation, Tokyo, Japan

[21] Appl. No.: 634,804

[22] Filed: Apr. 19, 1996

[30] Foreign Application Priority Data

Apr. 27, 1995 [JP] Japan .................................. 7-104377

[51] Int. Cl.⁶ ............................................... G11B 15/12
[52] U.S. Cl. ............................................. 360/62; 360/31
[58] Field of Search .............................. 360/62, 66, 113, 360/22, 46, 31, 53

[56] References Cited

U.S. PATENT DOCUMENTS

| | | | |
|---|---|---|---|
| 4,821,125 | 4/1989 | Christensen et al. | 360/31 |
| 5,053,892 | 10/1991 | Supino, Jr. et al. | 360/62 |
| 5,600,500 | 2/1997 | Madsen et al. | 360/46 |

*Primary Examiner*—Aristotelis M. Psitos
*Assistant Examiner*—Patrick Wamsley
*Attorney, Agent, or Firm*—Young & Thompson

[57] ABSTRACT

A magnetic disk unit of the invention comprises;

a thin film magnetic head 1 for performing a specified magnetic recording/reproducing operation on a magnetic disk, a reproduction error detecting means 2 for detecting an error in reproduced data read by the thin film magnetic head 1, a current value setting means 3 for setting an amount of write current to be applied to the thin film magnetic head according to a condition of error detection of the reproduction error detecting means 2 as a value smaller compared with a normal write current value, and a write operation driving means 4 for applying a write current after being set by the current value setting means 3 to the thin film magnetic head 1.

13 Claims, 3 Drawing Sheets

MAGNETIC DISK UNIT

BACKGROUND OF THE INVENTION

1. Field of the Invention

The present invention relates to a magnetic disk unit and particularly to a magnetic disk unit having a thin film magnetic head mounted on it.

2. Description of the Prior Art

In a magnetic disk unit having a thin film head, when a write current is applied to a coil of a thin film magnetic head, a magnetic field is generated and thanks to the magnetic field, a magnetic domain wall moves in a direction where a magnetizing component in the direction of the magnetic field is increased in a pole part of the thin-film magnetic head. As a rule, a moving speed of the magnetic domain wall decreases due to action of an eddy current and the like concentrated near the magnetic domain wall, and particularly the magnetic domain wall has difficulty moving in a magnetic field of high frequency. Here, when an applied current is cut off, a magnetic domain structure is determined so as to minimize the sum of its magneto static energy, anisotropic energy, and exchange energy of the magnetic particles in the head. The newly formed magnetic domain structure is formed so as to be slightly different in microstructure from the magnetic domain structure before a write current is applied to it, under the influence of stress from an alumina film, microdefects in a permalloy material, a profile of the write current, and the like.

On the other hand, when reading data on a magnetic disk by means of a thin film magnetic head, microscopic magnetization on the magnetic disk causes a magnetic field to change in the vicinity of the pole part, turns the direction of magnetization inside a magnetic domain in the pole part, and moves its magnetic domain wall. As a result, current is induced in a coil of the thin film magnetic head and data is reproduced on the basis of a readback waveform of this current. The readback waveform depends upon a magnetic domain structure of the pole part, and the difference in microstructure of the magnetic domain structure has an influence on the readback waveform.

In the above-mentioned example of the prior art, however, there is a problem that data may not be normally read due to distortion of the readback waveform even if attempting to read data magnetized on the magnetic disk. Since such a problem is caused in relation to a magnetic domain structure in the pole part, there has been a troublesome problem that data cannot be normally reproduced even if a read operation is repeated any number of times, once such a failure occurs. There has been a serious problem that such a phenomenon becomes a fatal failure in a magnetic disk unit once this phenomenon occurs, although it is a very rare phenomenon which may happen several times for several ten thousand recording/reproducing operations.

U.S. Pat. No. 5,053,892 has disclosed a technique of performing a write operation after once moving a magnetic head to another track and repositioning it to the original track in order to recover such an error.

However, since this method moves once a magnetic head to another track and repositions it to the track where an error has happened, it has a problem that an error correction time is made long due to its long seek time.

SUMMARY OF THE INVENTION

An object of the invention is to provide a magnetic disk unit which does not need to move a magnetic head to another track and decreases an error correction time for recovering from an unreproducible state.

A magnetic disk unit according to the invention comprises a thin film magnetic head for performing a magnetic recording/reproducing operation over a magnetic disk, a reproduction error detecting means for detecting an error in reproduced data read by the thin film magnetic head, a current value setting means for setting an amount of a write current to be applied to the thin film magnetic head according to error detection of the reproduction error detecting means as a value smaller compared with a normal write current, and a write operation driving means for applying a write current after being set by the current value setting means to the thin film magnetic head.

BRIEF DESCRIPTION OF THE DRAWINGS

FIG. 4 is an explanatory figure for showing examples of readback waveform by a thin film magnetic head.

DETAILED DESCRIPTION OF THE PREFERRED EMBODIMENTS

An embodiment of the invention is described in the following with reference to FIGS. 1 to 4.

Figure 1:
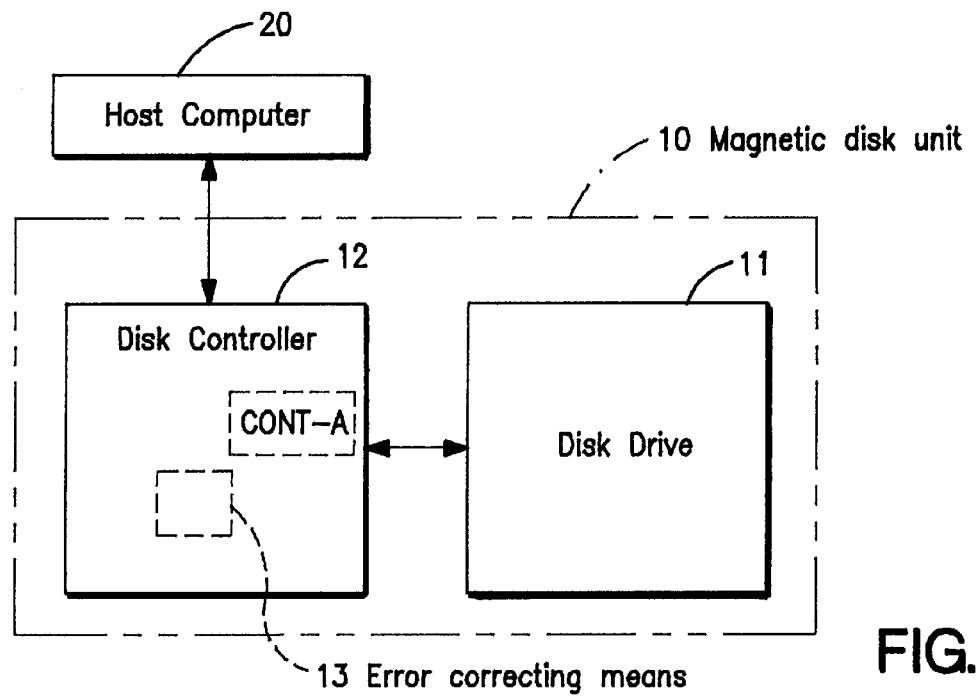
FIG. 1 is a simplified configurational figure for showing an embodiment of the invention.
Figure 2:
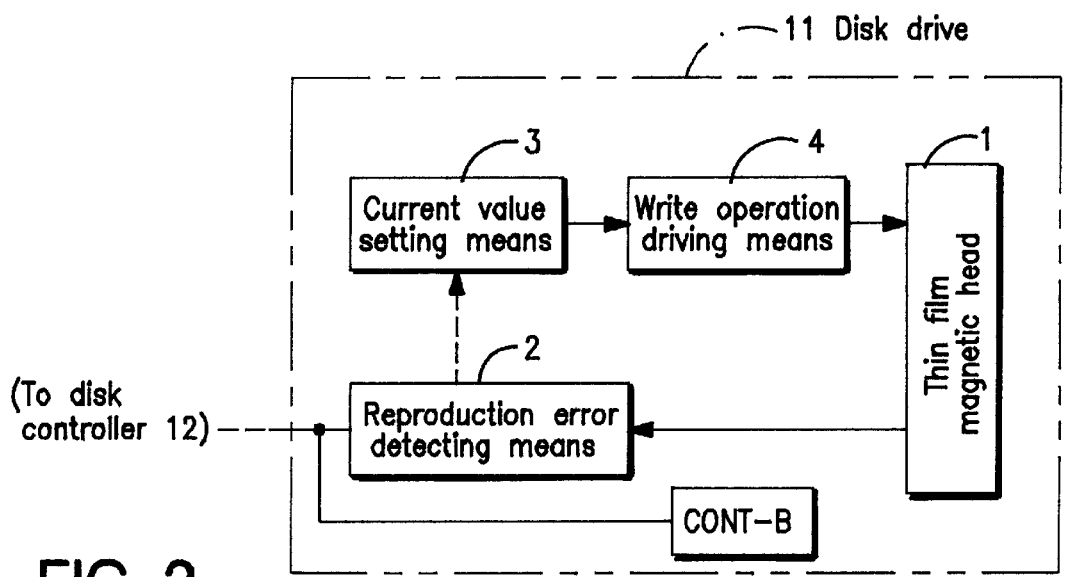
FIG. 2 is a block diagram for showing an internal structure of a disk drive shown in FIG. 1, with certain parts omitted.

In FIG. 1, a magnetic disk unit 10 connected to a host computer 20 is provided with a disk drive 11 for performing recording and reproducing operations on a magnetic disk and a disk controller 12 to control recording and reproducing operations of the disk drive 11.

The host computer 20 has a function of outputting specified control instructions for controlling the magnetic disk unit 10 and write/read instructions for reading/writing data to the disk controller according to a running program. On the other hand, the disk controller 12 has a function of outputting an operating status of the whole unit including the disk drive 11 and data read from the disk drive 11 to the host computer 20.

The disk controller 12 is provided with an error correcting means 13 for normally correcting data in case that the data read from the disk drive 11 are not normal and a controller A for controlling communication between the host computer 20 and the disk drive 11 as well as controlling operation of the error correcting means 13. This controller A transfers various data by executing one after another micro programs prepared in advance.

In this embodiment, the disk drive 11 is provided with a thin film magnetic head 1 for performing specified magnetic recording/reproducing operations on a magnetic disk (not illustrated), a reproduction error detecting means 2 for detecting an error in reproduced data read by the thin film magnetic head 1, a current value setting means 3 for setting an amount of a write current to be applied to the thin film magnetic head 1 as a small value which is 2% to 50% of a normal write current according to error detection of the reproduction error detecting means 2, and a write operation driving means 4 for applying a write current after being set by the current value setting means 3 to the thin film magnetic head 1. In addition to them, the disk drive 11 is provided with a recording/reproducing system necessary for normal data recording and reproducing operations and a controller B for individually controlling operations of these respective parts.

Furthermore describing them in detail, in this embodiment, the current value setting means 3 is provided with a function of keeping a write current set as a value half or less compared with a normal value as described above until data on the magnetic disk which have caused an error to happen are normally read, and a write current incrementally increasing function of gradually increasing a write current set as a small value each time an error in the reproduced data is repeatedly detected.

Concretely, the current value setting means 3 is provided with a microcomputer, counts the number n of errors consecutively detected by the error detecting means 2, and sets a specified write current in the write operation driving means according to the result.

Figure 5:
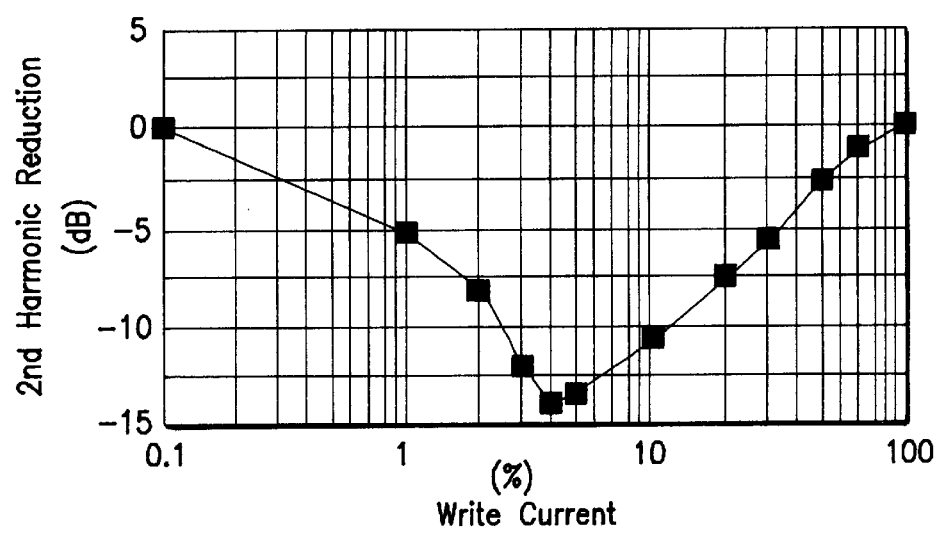
FIG. 5 is a graph illustrating the relation between a write current value and an amount of attenuation of the second harmonic in a readback waveform.

FIG. 5 shows relation between a write current value and an amount of attenuation of the second harmonics of reproduced signals (an amount of level change of the second harmonics of reproduced signals before and after applying the write current).

A write current value is represented by a percentage to the normal write current value which is assumed as 100%.

Generally it is known that the less a waveform distortion is, the less the power of the second harmonic is. Namely, the greater the attenuation of the second harmonic, the greater the improvement in waveform distortion.

When a write current value is very small, such as 0.1% of a normal write current, since an magneto motive force great enough to change to magnetic domain structure of a pole part of a magnetic head is not generated, a waveform is not improved in distortion and an amount of attenuation of the second harmonic is 0.

When the write current value is increased to 0.3%, the attenuation of the second harmonic becomes 2.5 dB so that its effect may appear a little.

When the write current value is further increased to 2%, a sufficient magneto motive force is generated, a waveform is considerably improved in distortion, and an amount of attenuation of the second harmonic becomes increases to 8 dB. And when the write current value is 4%, an amount of attenuation of the second harmonic reaches the peak as 14 dB. When the write current value continues to be further increased, however, it results in beginning to erase the already written data and the amount of attenuation begins to decrease. When the write current value is about 20%, the attenuation becomes 8 dB and when the write current value is 50%, the attenuation becomes 2.5 dB, and when the current value is increased more than this, its effect becomes little.

Namely, a condition which brings an effect to some degree is a condition that the write current value is 0.3% to 50%, where an amount of attenuation of the second harmonic is 2.5 dB or more, and a condition which brings a great effect is a condition that the write current value is 2% to 20%, where an amount of attenuation of the second harmonic is 8 dB or more. In a particularly preferable condition that the write current value is 3% to 6%, an amount of attenuation of the second harmonic reaches 12 dB or more.

When a magnetic head begins to overwrite the disk, since overwritten data is set twice the frequency of data written first, the power of the basic frequency of the overwritten data, which corresponds to the second harmonic component of data written first, becomes larger. Second harmonic reduction is shown in FIG.5.

Next, the whole operation of this embodiment is described in the following as referring to FIGS. 3 and 4.

When a read instruction for reading data is input from the host computer 20 into the disk controller 12, the disk drive 11 is controlled by the disk controller 12, and specified reproduced data are output from the thin film magnetic head 1. The reproduction error detecting means 2 judges whether or not the read reproduced data have an error, and in case that an error has been detected, the read said data are input into the error correcting means 13 of the disk controller 12. Here, if normal data can be obtained by correcting the error, said normal data are output to the host computer 20.

On the other hand, in case that the error cannot be corrected by the error correcting means 13, the error correcting means 13 notifies the controller A of that fact. The controller A which has received the notification that the error cannot be corrected executes an error processing program prepared in advance, and inputs a series of control instructions for correcting the error into the controller B of the disk drive 11. In response to these control instructions, the controller B cause a positioning operation for positioning the thin film magnetic head 1 accurately over a track and then makes it read the read data again.

Figure 3:
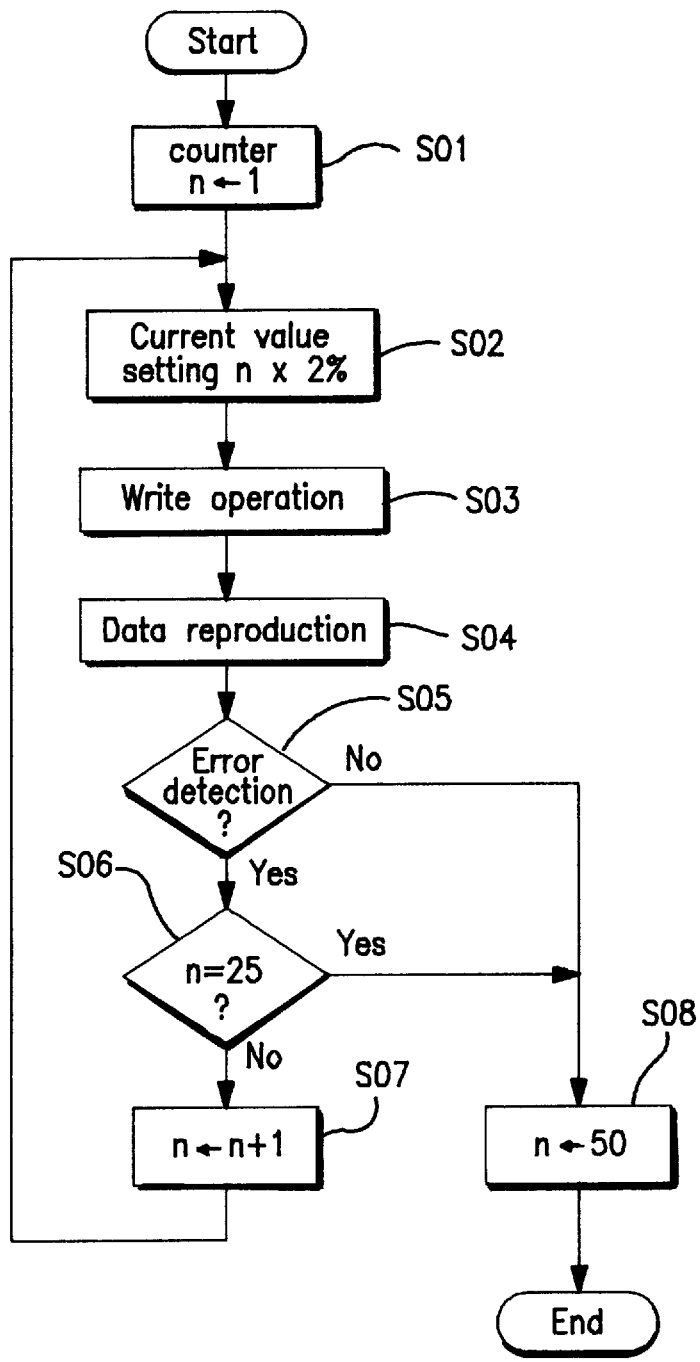
FIG. 3 is a flowchart for explaining an error recovery operation of the embodiment shown in FIG. 1.
Figure 4A:
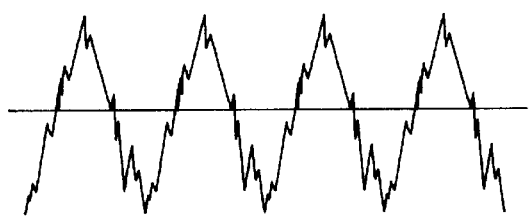
FIG. 4A shows a distorted waveform before performing an error recovery operation and FIG. 4B shows a normal waveform obtained after the error recovery operation.

In case that an error is detected in the same reproduced data in spite of the above-mentioned error processing process, it is judged that an improper change has happened in a magnetic domain structure in the pole part of the thin film magnetic head and an error recovery operation shown in FIG. 3 is performed by functions of the controller B and other parts. In such a case, it is known that a readback waveform is in a state where it is distorted by noises as shown in FIG. 4A and a number of errors often occur.

First, n=1 is set in a counter provided on the current value setting means 3 (Step S01). After this, the current value setting means 3 sets a current value equivalent to (n×2%) of a normal write current in this embodiment in the write operation driving means 4 (Step S02). Next, the controller B makes the write operation driving means 4 act so as to apply a write current of 2% (n×2%) of the normal write current value to the thin film magnetic head 1 (Step S03). Thus a magnetic domain structure in the pole part of the thin film head 1 is a little changed without producing an influence upon data already recorded on the magnetic disk. Next, the controller B causes the data related to an error to be read again (Step S04).

Figure 4B:
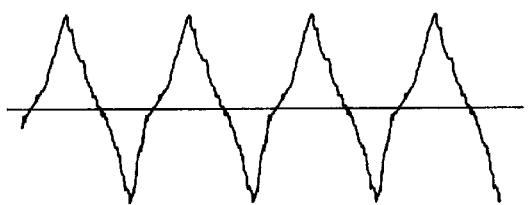

At this time, if normal data can be read without detecting an error, n=50 is set in the counter n of the current value setting means 3 and the error recovery operation ends (Step S08). In this case, the reproduced data are normalized as shown in FIG. 4B. After this, since a write current value of 100% (50×2%) as the normal current value is set in the write operation driving means 4, a normal write operation can be performed.

On the other hand, in case that an error is still detected, n is increased as n=2 (Step S07), and the same process as described above is performed by means of a slightly increased write current. The above-mentioned operations are repeated up to 25 times in this embodiment and in the last a write operation is performed by means of a write current of 50% of the normal current, and then a data reproduction is performed. In case that an error is still detected in spite of this process, it is judged that the data cannot be read and the error recovery operation is terminated (Step S08).

In this way, according to this embodiment, in case that an error is detected in reproduced data due to a magnetic domain structure in the pole of the thin film magnetic head, since the current value setting means sets a write current value as a small value half or less compared with a normal write current value and a write operation is performed by means of this small write current value, the magnetic domain structure in the pole of the thin film magnetic head can be slightly changed and thanks to this a reproduction error caused by a magnetic domain structure which has been unable to recover can be recovered in high probability without producing an influence upon data already recorded on the magnetic disk. Therefore, this embodiment can suppress an error caused by a magnetic domain structure of a thin magnetic head which has happened as a fatal failure and has been unable to recover up to now, and is useful for improving a magnetic disk unit in life.

And since in case that one error recovery operation does not recover the error a retry operation of it is performed, this embodiment can recover a reproduction error caused by a. magnetic domain structure of the thin film head in higher probability.

Furthermore, since a write current value which has been set as a small value is gradually increased in repeated of the error recovery operations, the write current value for an error recovery operation can always be controlled down to the minimum necessary condition, and thanks to this a bad influence upon data recorded in advance on the magnetic disk can be suppressed to a minimum.

Still further, since the current value setting means limits the number of consecutive retry operations of the error recovery operation up to 25 and terminates the error recovery operation when a write current for the error recovery operation reaches 50% of the normal write current, data already recorded on the magnetic disk can be kept in safety. And since a write current value in the current value setting means 3 is uniquely set on the basis of the counter n which increases each time the error recovers operation is repeated, such a configuration is comparatively easy to design.

Here, differently from this embodiment, it will do also to perform only once a retry operation of the error recovery operation. In this case, for example in FIG. 5, a write current value for the error recovery operation is set as about 4% of the normal write current value. Alternatively, an incremental step by which the write current value is increased and the number of retry operations may be set at the user's discretion.

According to the invention, which is configured and operated as described above, in case that an error is detected in reproduced data due to a magnetic domain structure in the pole of the thin film magnetic head, since the current value setting means 3 sets a write current value as a small value half or less compared with a normal write current value and a write operation is performed by means of this small write current value, the magnetic domain structure in the pole of the thin film magnetic head can be slightly changed and thanks to this a reproduction error caused by a magnetic domain structure which could not be recovered can be recovered in high probability without influencing data already recorded on the magnetic disk. Therefore, the invention can suppress an error caused by a magnetic domain structure of a thin magnetic head which has happened as a fatal failure and has been unable to be recovered up to now, and is useful for improving a magnetic disk unit in life And the invention does not need to move the magnetic head to another track and can make shorter the time required for correcting an error in order to recover an unreproducible state. Moreover, since the invention does not perform an operation of moving the thin film magnetic head to another track, it can implement an error correcting circuit more simply and more inexpensively.

Modifications of the invention herein disclosed will occur to a person skilled in the art and all such modifications are deemed to be within the scope of this invention as defined by the appended claims.

What is claimed is:

1. A magnetic disk unit comprising:
   a thin film magnetic head for performing magnetic recording and reading operations on a magnetic disk;
   reproduction error detecting means for detecting an error in data read by said magnetic head;
   current value setting means for setting a write current to be applied to said magnetic head to correct the detected erroneous data, said setting means for initially setting the write current to an initial value to enhance the read data that is less than a normal write current used when writing data normally with said magnetic head and less than a current that obliterates the erroneous data, and for subsequently setting the write current to the normal write current; and
   write operation driving means for applying to said magnetic head the write current set by said setting means.

2. A magnetic disk unit as defined in claim 1, wherein;
   said write current is greater than 0.3% and smaller than 50% of the normal write current before being set to the normal write current.

3. A magnetic disk unit as defined in claim 1, wherein;
   said write current is greater than 2% and smaller than 20% of the normal write current before being set to the normal write current.

4. A magnetic disk unit as defined in claim 1, wherein;
   said write current is greater than 3% and smaller than 6% of the normal write current before being set to the normal write current.

5. A magnetic disk unit as defined in claim 1, wherein;
   said current value setting means maintains the write current less than the normal write current until the data on the magnetic disk is read without error.

6. A magnetic disk unit as defined in claim 5, wherein;
   said write current is greater than 0.3% and smaller than 50% of the normal write current before being set to the normal write current.

7. A magnetic disk unit as defined in claim 6, wherein;
   said current value setting means comprises a write current incrementally increasing function for gradually increasing an amount of the write current each time an error is repeatedly detected in the erroneous data.

8. A magnetic disk unit as defined in claim 5, wherein;
   said current value setting means comprises a write current incrementally increasing function for gradually increasing an amount of the write current each time an error is repeatedly detected in the erroneous data.

9. A magnetic disk unit as defined in claim 5, wherein;
   said write current is greater than 2% and smaller than 20% of the normal write current before being set to the normal write current.

10. A magnetic disk unit as defined in claim 9, wherein;
    said current value setting means comprises a write current incrementally increasing function for gradually increasing an amount of the write current each time an error is repeatedly detected in the erroneous data.

11. A magnetic disk unit comprising:

a thin film magnetic head for performing magnetic recording and reading operations on a magnetic disk;

reproduction error detecting means for detecting an error in data read by said magnetic head;

current value setting means for setting a write current to be applied to said magnetic head to correct the detected erroneous data, said setting means for initially setting the write current to an initial value to enhance the read data that is less than one half a normal write current used when writing data normally with said magnetic head, for incrementally increasing the write current each time the erroneous data is found to be still in error to no more than half the normal write current, and setting the write current to the normal write current when the erroneous data is no longer detected; and write operation driving means for applying to said magnetic head the write current set by said setting means.

12. A magnetic disk unit as defined in claim 11, wherein;

said write current is greater than 2% and smaller than 20% of the normal write current before being set to the normal write current.

13. A magnetic disk unit as defined in claim 11, wherein;

said write current is greater than 3% and smaller than 6% of the normal write current before being set to the normal write current.

* * * * *